UNITED STATES PATENT OFFICE.

ELMINA BRADY, OF PORTLANDVILLE, NEW YORK.

COMPOSITION OF MATTER FOR MOLDING FRUITS, FANCY-TOPPED TABLES, BIRDS, &c.

SPECIFICATION forming part of Letters Patent No. 291,284, dated January 1, 1884.

Application filed June 18, 1883. (No specimens.)

*To all whom it may concern:*

Be it known that I, ELMINA BRADY, of Portlandville, in the county of Otsego and State of New York, have invented a new and Improved Composition of Matter for Molding Fruits, Fancy-Topped Tables, Birds, &c., of which the following is a full, clear, and exact description.

The object of my invention is to provide a new composition of matter which may be molded or shaped readily in the plastic state to form various articles of ornament and utility, which are subjected to a baking and hardening process before the final color-finish is applied.

My improved composition consists of the following ingredients, combined in about the proportions stated, viz: hard stone, ground fine, one pound; slate stone, ground fine, one pound; common sand, ground fine, one-quarter pound; white sand, ground fine, one-quarter pound; clam-shells, ground fine, one-sixth pound; common brick, ground fine, one-quarter pound; charcoal, ground fine, one-quarter pound; blue clay, ground fine, three pounds; linseed oil, one pint, and water, as hereinafter stated.

In the preparation of the composition, I first mix the hard stone, slate stone, common sand, white sand, clam-shells, common brick, and charcoal intimately together. I then add the blue clay and sufficient water to make a rather stiff plastic mass, and finally add the linseed oil; but I may not follow this exact routine in mixing the materials.

This composition may be molded or shaped into various articles of ornament and utility—such as fruit-baskets and fruits, fancy-topped tables, birds, shells, or in fact any form to suit the taste and skill of the designer—and the molded articles are then to be baked in any suitable oven until quite hard and then placed in any suitable metallic open-work vessel or basket, wherein they are subjected to a blaze or flame to still further harden or glaze them, and then finally finished in paint or color and varnish, as desired.

The ingredients of this composition act as follows: The fine hard stone and slate stone make the composition hard, the sand, clam-shells, charcoal, and brick prevent shrinkage, the blue clay acts as a cement to bind the mass together, and the linseed oil prevents the composition from sticking to hands when molding it to shape.

Having thus described my invention, what I claim as new, and desire to secure by Letters Patent, is—

The herein-described composition of matter from which to mold articles of ornament and utility, consisting of hard stone, common sand, slate stone, white sand, clam-shells, common brick, charcoal, blue clay, water, and linseed oil in the proportions substantially as herein specified.

ELMINA BRADY.

Witnesses:
MUSEY S. COOKE,
DEWITT DEUEL.